United States Patent [19]

Nowak et al.

[11] 3,792,988

[45] Feb. 19, 1974

[54] METHOD OF MAKING GLASSWARE

[75] Inventors: Edward A. Nowak, Toledo, Ohio;
Philip P. Pahl, Lambertville, Mich.

[73] Assignee: Owens-Illinois, Inc., Toledo, Ohio

[22] Filed: July 6, 1971

[21] Appl. No.: 159,611

[52] U.S. Cl.............. 65/79, 65/82, 65/229, 65/262, 65/DIG. 10
[51] Int. Cl............................... C03b 9/14
[58] Field of Search .... 65/242, 79, 78, DIG. 10, 82, 65/229, 262

[56] References Cited
UNITED STATES PATENTS

| | | | |
|---|---|---|---|
| 1,618,747 | 2/1927 | Bartlett | 65/DIG. 10 |
| 2,417,328 | 3/1947 | Sloan | 65/DIG. 10 |
| 3,271,123 | 9/1966 | Benard | 65/82 X |
| 1,529,622 | 3/1925 | Haley | 65/DIG. 10 |
| 3,071,946 | 1/1963 | Watson et al. | 65/DIG. 10 |
| 3,130,030 | 4/1964 | Watson et al. | 65/79 |
| 3,180,717 | 4/1965 | Treece | 65/DIG. 10 |
| 3,434,820 | 3/1969 | Zappia et al. | 65/242 X |
| 1,885,303 | 11/1932 | Slick | 65/78 |
| 1,972,717 | 9/1934 | Schutz | 65/79 |
| 3,468,648 | 9/1969 | Novak | 65/79 X |
| 2,523,737 | 9/1950 | Tourres | 65/DIG. 10 |
| 1,527,947 | 2/1925 | Woods | 65/79 |
| 704,761 | 7/1902 | Schaub | 65/DIG. 10 |

FOREIGN PATENTS OR APPLICATIONS 615,514   6/1961   Italy .................................. 65/79

*Primary Examiner*—Frank W. Miga
*Attorney, Agent, or Firm*—Richard B. Dence; E. J. Holler

[57] ABSTRACT

A method of making glassware wherein a charge of glass is shaped in a parison mold to form an elongated hollow parison, thereafter enclosed in a finishing mold which has a hollow bowl shaping portion, an intermediate constricted portion, and large base forming portion. An intermediate portion of the parison is caused to engage the intermediate portion of the finishing mold and a portion of the hollow parison is caused to extend into the portion of the mold below the restricted portion. The hollow body portion of the parison is then blown outwardly onto the bowl shaping portion and the base forming portion of the finishing mold, and finally a force is applied to the lower end portion of the expanded parison to form it into solid configurational conformity with the base forming portion of the finishing mold and a movable forming plate.

4 Claims, 25 Drawing Figures

PATENTED FEB 19 1974 3,792,988

INVENTOR.
EDWARD A. NOWAK
PHILLIP P. PAHL
BY Richard B. Dence
E. J. Holler
ATTORNEYS INVENTOR.
EDWARD A. NOWAK
PHILLIP P. PAHL
BY Richard D. Dence
E. J. Holler
ATTORNEYS

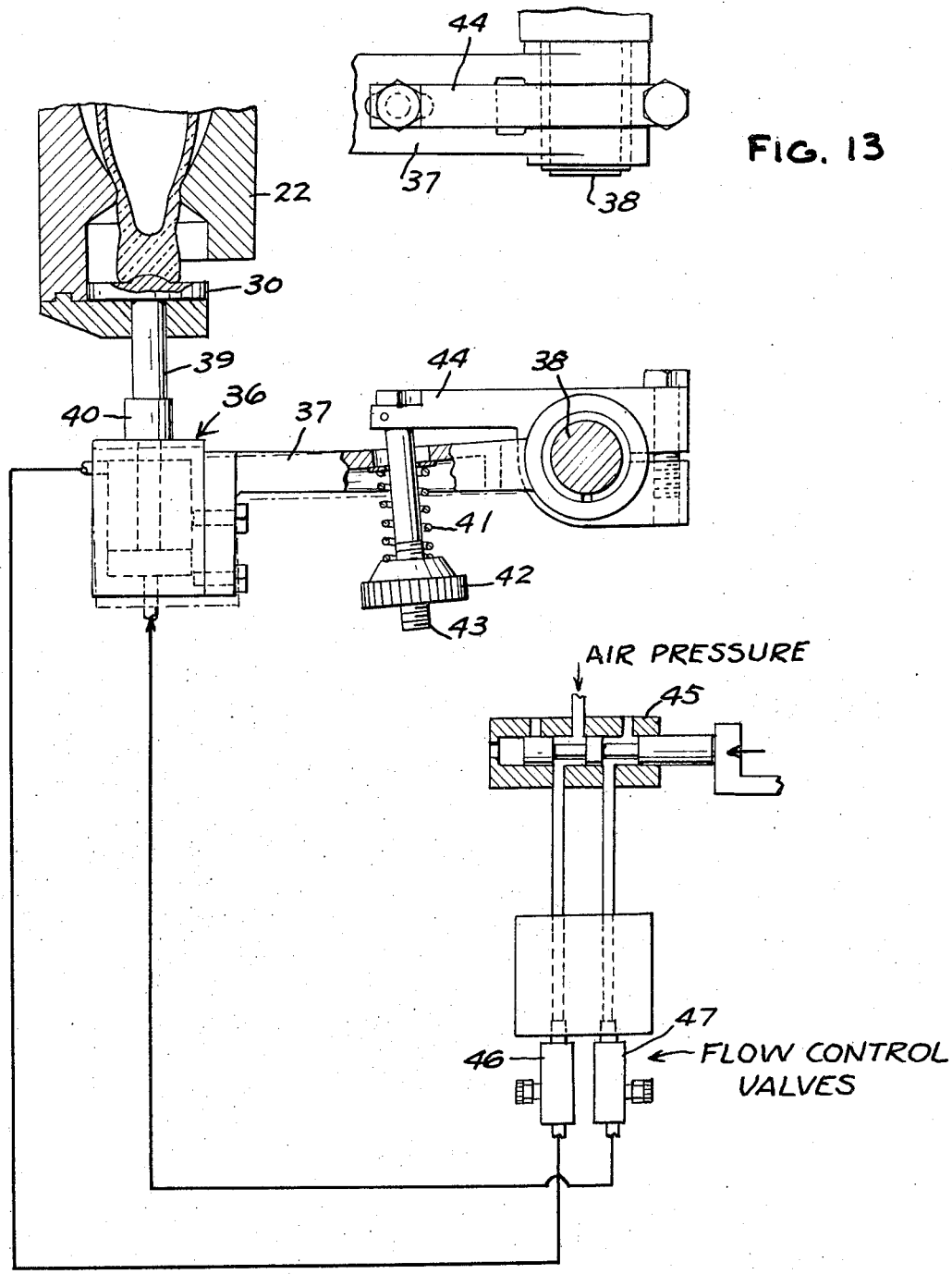

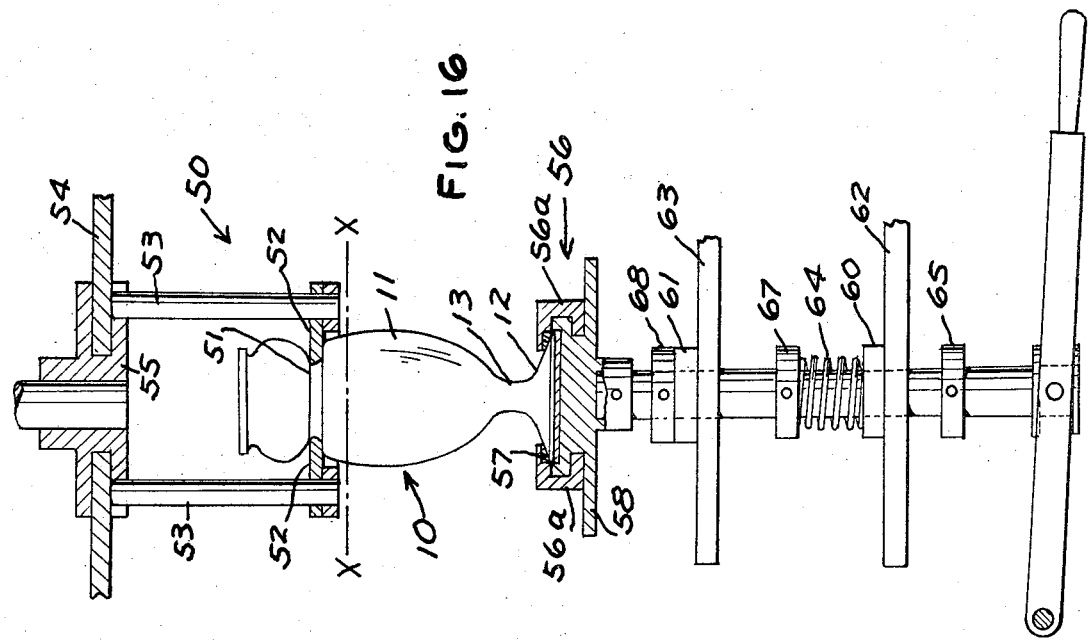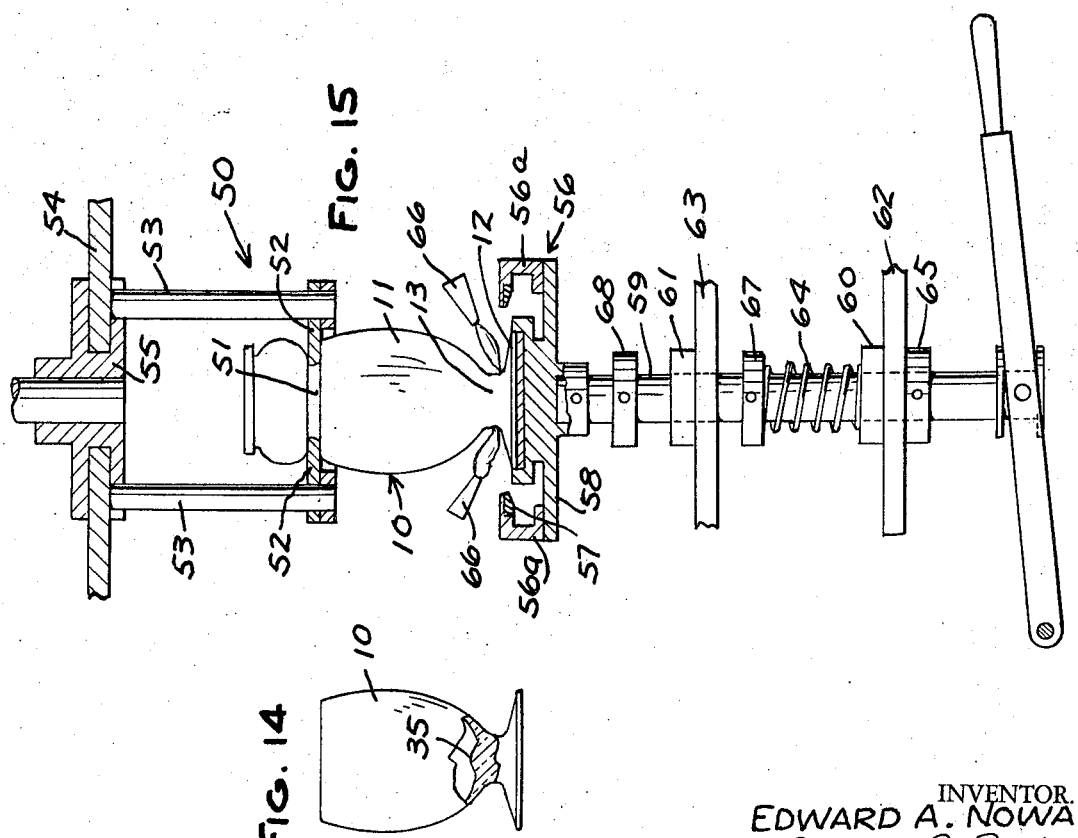

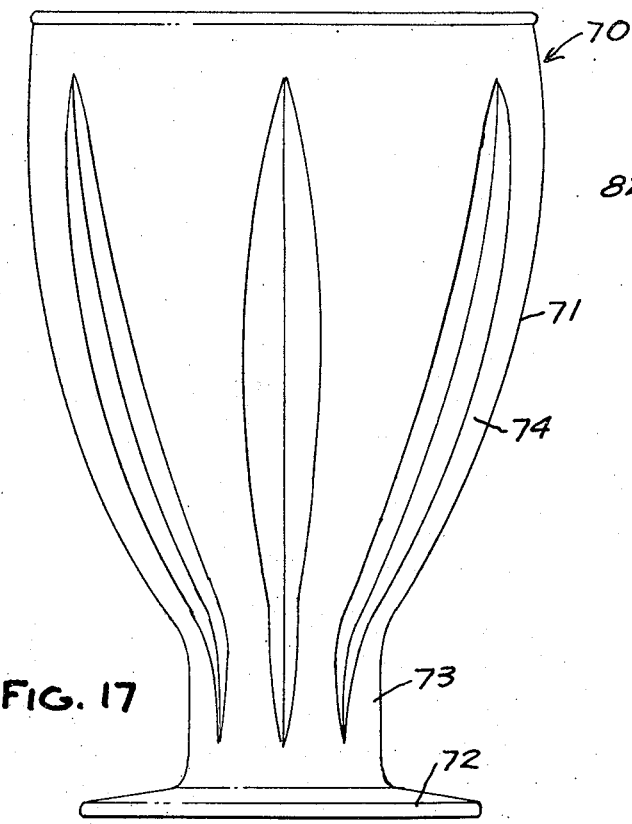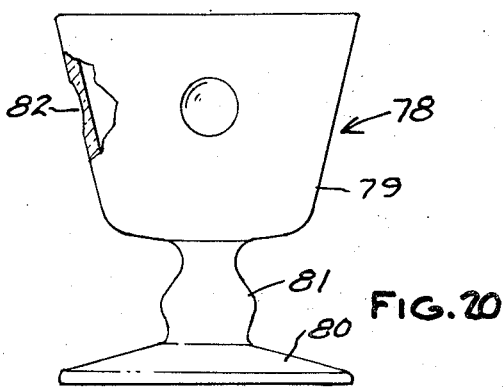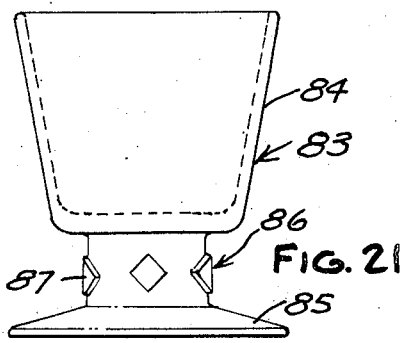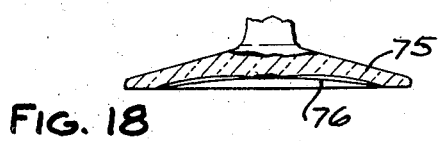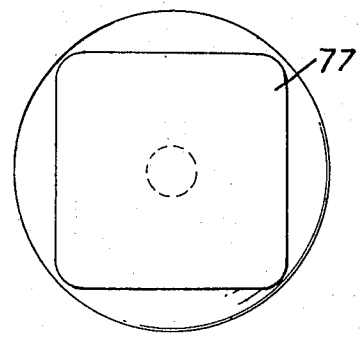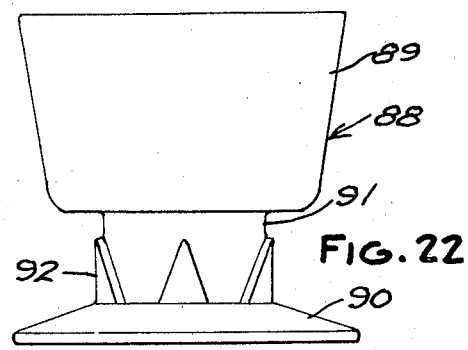

METHOD OF MAKING GLASSWARE

This invention relates to forming glassware and particularly to forming glassware having a heavy base portion or a heavy base portion with an intermediate stem portion.

BACKGROUND OF THE INVENTION

In the making of hollow glass articles, such as stemware, it is common to form the hollow bowl portion of the glass article on a machine commonly known as a Westlake machine, such as shown in the U.S. Pat. to Kadow No. 1,527,556. A separately formed stem or foot is then joined to the hollow body portion that has been made.

It has heretofore been suggested, as shown in the expired U.S. Pat. to Schutz No. 1,972,717, that a heavy base glass article can be formed by first blowing the body portion and base and thereafter pressing the base to squeeze a portion of the glass that has been blown into a foot. Such a method has not proven commercially satisfactory.

It has also been heretofore suggested that as suggested in the U.S. Pats. to Watson et al No. 3,071,946 issued Jan. 8, 1968, and No. 3,130,030 issued Apr. 24, 1964, that glass articles can be formed on a Westlake type machine by first forming a hollow parison by puffing a charge or blast of air in the conventional manner in which a hollow parison is formed in a Westlake machine and thereafter enclosing the parison in a finishing mold, blowing the parison outwardly against the hollow bowl shaping portion of the finishing mold, and finally applying an axial force to the lower end of the parison to form a heavy base. The heavy base can be thereafter stretched to form stemware.

A major problem with respect to the glassware made in accordance with the Watson et al patents is the lack of uniformity of parison and, in turn, the final article, which is inherent in the Westlake type process.

One of the problems with the method and apparatus of the Watson et al type is that the parison is formed by vacuum gathering and then a puff of air forms a bubble that is then permitted to sag. Because the parison is relatively hot and unconfined, irregularities in the shape of the parison often occur and it is difficult to form parisons of consistent size and shape prior to blowing in successive molds or cycles of the machine. Another problem is that in such machines, only one or several gathering or parison molds are provided for a large number of finishing molds. As a result, the parison molds operate at a relatively high temperature so that it is difficult to control the shape of the parison in this relatively high temperature range. Another problem resulting from operating in a high temperature range is that a large mass of relatively hot glass is gathered or accumulated on the forming plate of the mold. Such a high temperature produces a large reservoir of heat which cannot be readily dissipated. The machine must therefore be operated at a slower speed to insure heat dissipation resulting in lower productivity.

A further problem with the method and apparatus of the Watson type is that a large solid mass of glass in the base or end portion of the parison may result in forcing some of the glass upwardly through the restricted portion of the mold producing articles having incomplete base portions. A further problem is that the glass is permitted to collect on the forming plate and, as a result, the forming plate must be flat or concave which may result in articles which have a convex bottom and therefore are unstable.

In the copending application of Robert J. Miner and Harry W. Meek, Ser. No. 778,645, filed Nov. 25, 1968, and having a common assignee with the present application, there is disclosed a method and apparatus which includes the steps of pressing a charge of glass into a hollow parison and thereafter enclosing the parison in a finishing mold, blowing the parison outwardly in the finishing mold, and thereafter forming the base to form the heavy base article. Such a method and apparatus, as in the case of the Watson et al type, utilizes a parison having a large mass of glass in the end which tends to be forced upwardly when the base portion is formed resulting in articles having incomplete base portions. A further problem is that because the parison is relatively uncontrolled laterally, eccentric or "banana" shaped parisons are produced resulting in unsymmetrical articles or in articles that are pinched between halves of the mold as the mold halves closed.

Among the objects of the invention are to provide an improved method and apparatus of the Miner et al type; wherein heavy based articles or stemware are produced uniformly and consistently and at high rates of production; and which method and apparatus obviates or minimizes the problems inherent in prior art methods and apparatus.

SUMMARY OF THE INVENTION

A method of making glassware wherein a charge of glass is shaped in a parison mold to form an elongated hollow parison, thereafter enclosed in a finishing mold which has a hollow bowl shaping portion, an intermediate constricted portion, and large base forming portion. An intermediate portion of the parison is caused to engage the intermediate portion of the finishing mold and a portion of the hollow parison is caused to extend into the portion of the mold below the restricted portion. The hollow body portion of the parison is then blown outwardly onto the bowl shaping portion and the base forming portion of the finishing mold, and finally a force is applied to the lower end portion of the expanded parison to form it into solid configurational conformity with the base forming portion of the finishing mold and a movable forming plate. The restricted portion is dimensioned and positioned such that it is engaged by the parison upon closing of the finishing mold to act as a bearing or guide and thereby maintain the parison coaxial or centered to produce a uniform base portion on the final article. In addition, the restricted portion also functions to retard the downward movement of the parison and thereby assists in controlling the amount of glass in the base portion of the article.

DESCRIPTION OF THE DRAWINGS

FIG. 12 is a partly diagrammatic view of a portion of the apparatus embodying the invention.

FIG. 13 is a fragmentary view taken in the direction of the arrow in FIG. 12.

FIG. 14 is a fragmentary vertical sectional view of a modified article.

FIG. 15 is a vertical sectional view of an apparatus for heating localized portions of a glass article prior to stretching.

FIG. 16 is a view similar to FIG. 13 showing the parts in a different operative position.

FIG. 17 is a vertical elevational view of another type of article that can be manufactured in accordance with the invention.

FIG. 18 is a fragmentary vertical part sectional view of another type of article that can be manufactured in accordance with the invention.

FIG. 19 is a bottom plan view of another type of article that can be manufactured in accordance with the invention.

FIG. 20 is a vertical elevational view of another type of article that can be manufactured in accordance with the invention.

FIG. 21 is a vertical elevational view of another type of article that can be manufactured in accordance with the invention.

FIG. 22 is a vertical elevational view of another type of article that can be manufactured in accordance with the invention.

DESCRIPTION

Figure 1:
FIG. 1 is an elevational view of one type of article made in accordance with the invention.
Figure 2:
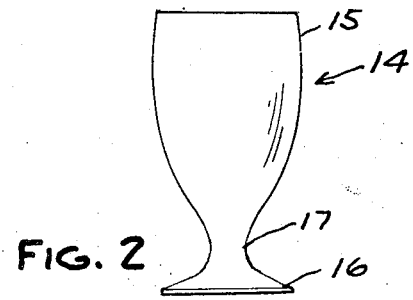
FIG. 2 is an elevational view of another type of article made in accordance with the invention.

Referring to FIG. 1, the method embodying the invention is intended to make hollow glass articles 10 which include a hollow bowl portion 11 and a large base 12. In the article shown in FIG. 1, the base 12 is connected to the bowl portion 11 by an intermediate portion 13 having a lesser cross section than the base 12. The method may also be used to form articles such as shown in FIG. 2 comprising a bowl portion 15, an enlarged base 16 and an intermediate stem 17 having a cross section less than that of the base 16.

Figure 3:
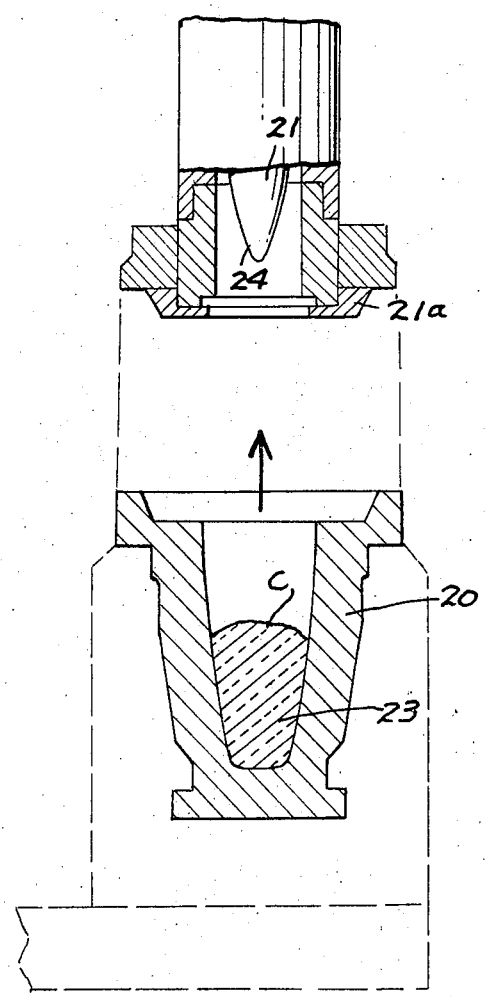
FIGS. 3–11 are vertical sectional views showing the relative position of the parts in different times during the formation of the articles.
Figure 5:
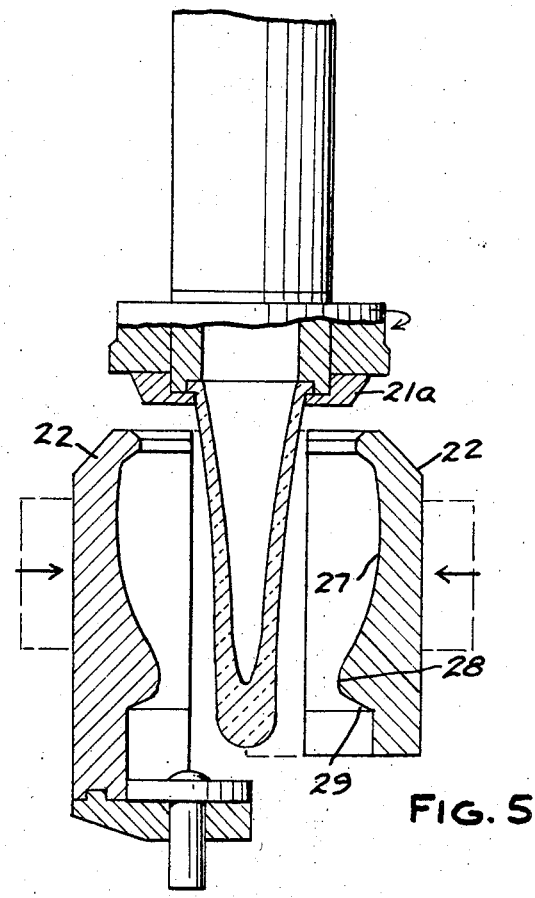
Figure 25:
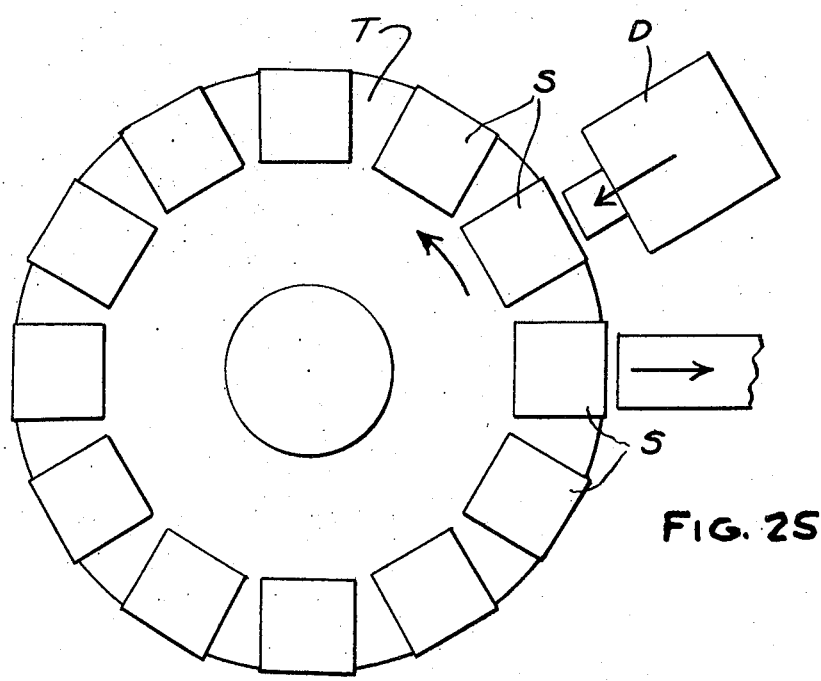
FIG. 25 is a diagrammatic plan view of a machine embodying the invention.

The method is particularly adapted to be performed in connection with a rotary press and blow type machine, shown diagrammatically in FIG. 25, which comprises a plurality of individual sections S mounted on a rotary table T. Each section S includes a one-piece parison mold 20 which is movable into and out of position beneath a plunger 21 and finishing molds comprising separable halves 22 that are movable into and out of closing relationship to the parison (FIGS. 3, 5).

As the table T rotates, each parison mold 20 is brought into position adjacent a delivery station and a charge C of settable viscous material such as glass is delivered by apparatus D to the open upper end of the parison mold 20. The charge C settles in the mold to the position shown in FIG. 3.

The parison mold 20 includes a hollow configuration that gradually tapers downwardly toward a relatively thick end 23. Plunger 21 is generally conical in shape terminating in an elongated tip 24.

Figure 4:
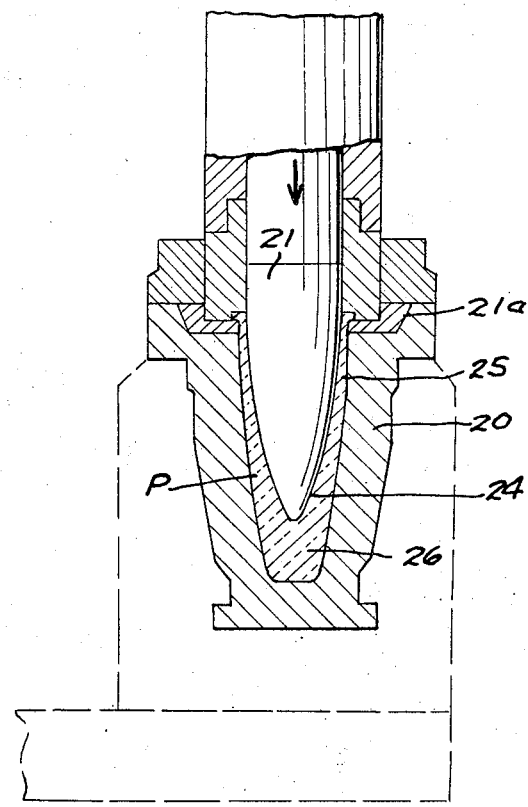

As shown in FIG. 4, the plunger 21 is moved downwardly into the charge C of glass in the parison mold 20 as the table rotates to form a parison P that has a hollow portion 25 merging into a heavy end or apex portion 26. A portable neck ring 21a forms a portion of the upper end of parison P. Plunger 21 and parison mold 20 are then moved axially away from the neck ring 21a to strip the parison from the parison mold as shown in FIG. 5 and halves of a finishing mold 22 are enclosed about the parison. The halves of the finishing mold 22 when brought together define a hollow bowl shaping portion 27, an intermediate restricted portion 28, and a base forming portion 29. Each pair of mold halves also has associated therewith a movable forming plate 30 that operates within a hollow portion 31 as presently described.

Where the article to be formed is symmetrical in that it comprises surfaces of revolution, the finishing mold 22 comprises a rotatable paste mold, but if the article is unsymmetrical in that all portions do not comprise surfaces of revolution, a non-rotatable metal mold can be used as a finishing mold.

Figure 6:
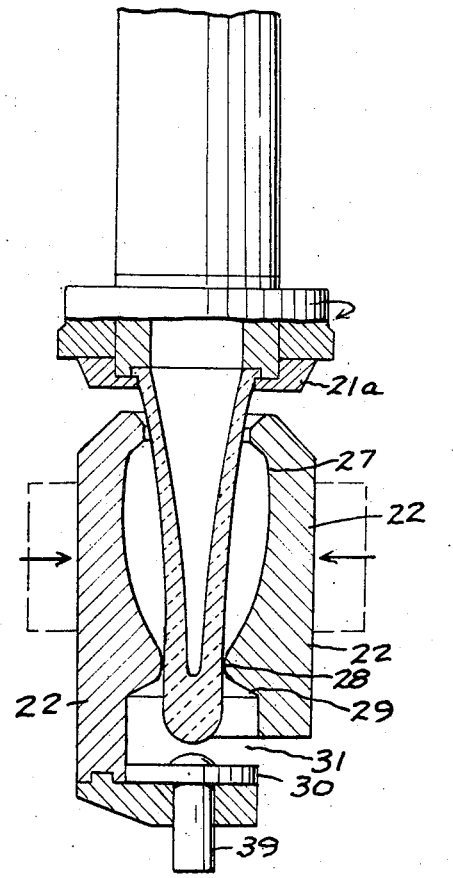
Figure 7:
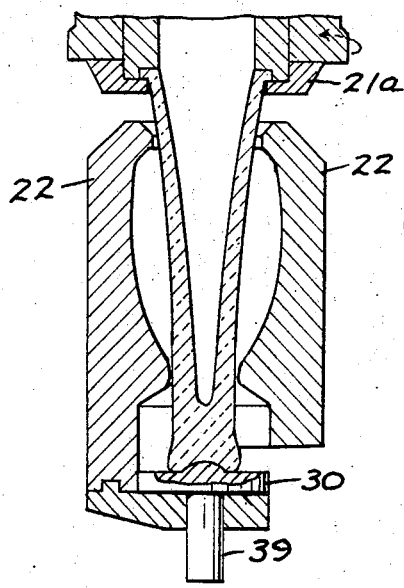

Immediately after the parison P has been moved away or stripped from the parison mold 20, if a paste finishing mold is used, the rotation of the parison is initiated while the parison begins to elongate or sag downwardly under the action of gravity (FIG. 6) so that when the mold halves complete their movement to enclose the parison, the hollow portion 31 of the parison is in the position shown in FIGS. 6 and 7. A portion of the hollow portion of the parison is below restricted portion 28 of the finishing mold. The parison then further sags downwardly as shown in FIG. 7 into contact with the forming plate 30.

Figure 8:
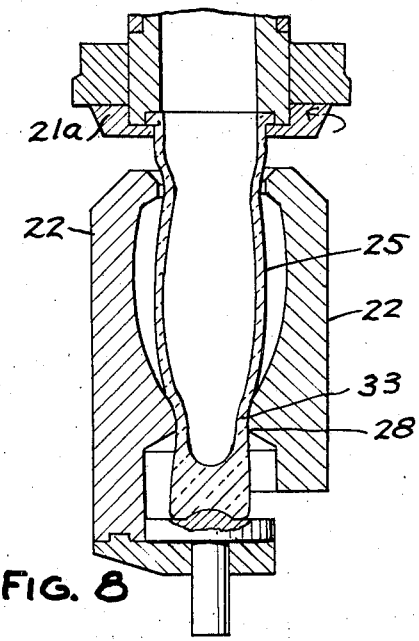
Figure 9:
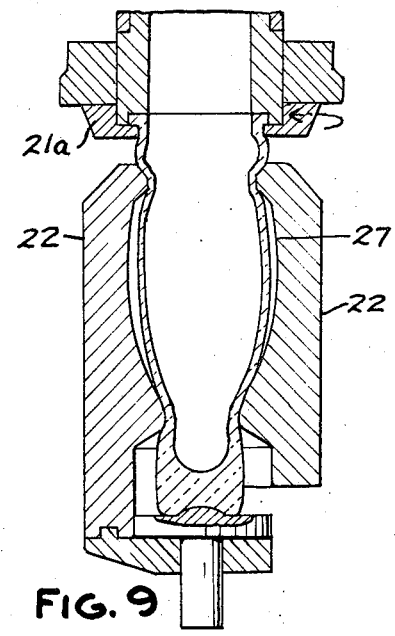

Air is initially introduced into the parison as shown in FIG. 8 to force the intermediate restricted portion 33 of the parison which is adjacent the constricted portion 28 of the finishing mold 22 outwardly against the constricted portion 28 of the finishing mold 22. In the event that the parison for some reason is not on center of the axis of the finishing mold when the finishing mold closes, the restricted portion 28 will engage the parison and move it into concentric relation with the mold. Further application of blowing air blows the bowl portion 25 of the parison outwardly toward the bowl forming portion 27 of the finishing mold 22 as shown in FIGS. 9 and 10.

Figure 10:
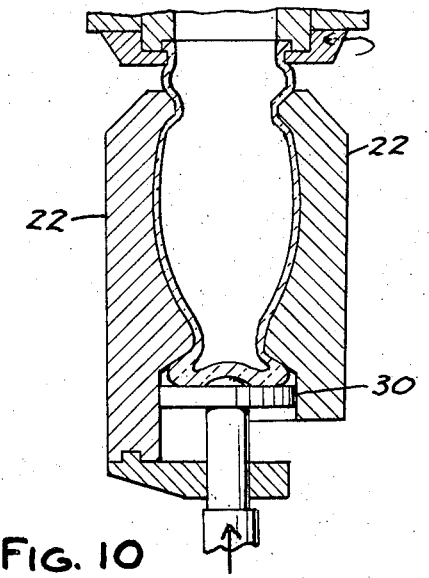
Figure 11:
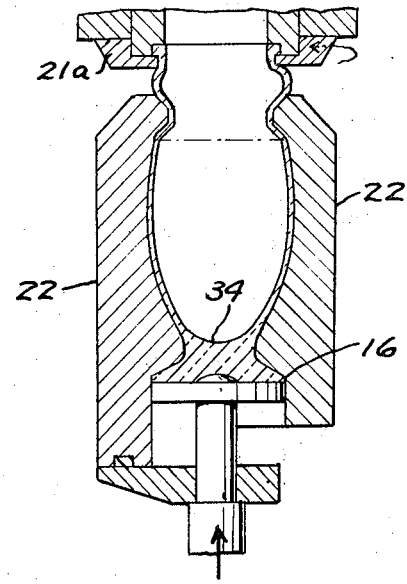

Finally, forming plate 30 is moved upwardly as the table rotates to force the glass into solid configurational conformity with the base forming portion 29 of the finishing mold (FIGS. 10 and 11).

By blowing the intermediate portion 33 of the parison initially outwardly against the constricted portion 28, the parison is guided and maintained in a generally central relationship with respect to the forming plate 30 so that when further air is blown into the parison, the center of the parison remains substantially on the center of the forming plate, thus producing an essentially symmetrical base, even though there may be thermal variations between one parison and another which might tend to cause the parison to move off center. Engagement of the parison with the restricted portion also functions to retard or meter the flow of glass downwardly so that it aids in controlling the amount of glass in the base portion of the final article.

If the final article is of the form shown in FIG. 1, sufficient glass is provided in the base portion of the parison so that the final article has a surface 34 (FIG. 11)

that is generally flat at the inside surface of the bowl portion thereof.

On the other hand, if the article is to be formed into an article of stemware, additional glass is provided in the base so that after the forming plate 30 is moved upwardly, the article has a configuration such as shown in FIG. 14 wherein the surface 35 on the interior of the bowl portion of the article projects upwardly.

The apertures for moving the forming plate 30 up and down within the finishing mold is shown in FIGS. 12 and 13 and comprises an air motor 36 associated with each forming plate 30 and mounted on an arm 37 swingable by a shaft 38 into and out of position adjacent the lower end of a projection 39 fixed on the plate 30 and extending downwardly therefrom. Air motor 36 includes a piston 40 which is engageable with the projection 39. The connection between the shaft 38 and arm 37 is through a spring 41 that is compressed between the arm 37 and an adjustable nut 42 on a threaded shaft 43 pivoted to a lever 44 that is fixed to the shaft 38. A shuttle valve 45 selectively controls a flow of air to flow control valves 46, 47 that are connected to opposite ends of the air motor 36. Operation of the air motor 36 projects the piston 40 to move the plate 30 upwardly. As the forming plate 30 encounters resistance due to the forming of the glass, spring 41 is compressed and controls the force with which the glass is formed. In its final upper position, the plate 30 is thus yieldingly forced upwardly by the resilient connection between the arm 37 and the shaft 38 until the end of piston 40 engages the portion of mold 22 which supports plate 30.

Flow control valves function to control the time when piston 40 is projected upwardly. This makes it possible to adjust each section S of the machine on the table T individually so that its respective forming plate 30 is moved upwardly in accordance with the individual requirements of the section.

The use of the adjustable spring support of arm 37 permits individual adjustment of the force with which the forming plate 30 of each section S forms the glass in that section.

Where it is desired to make articles of stemware having an elongated stem connecting the base and body or bowl portion, the glass article, such as shown in FIG. 14, is transferred to a station wherein the bowl and base portions are moved axially relative to one another to stretch the thickened intermediate portion 13 to form an elongated stem. Such an elongating apparatus is shown in FIGS. 15 and 16.

Referring to FIGS. 13 and 14, the elongating apparatus comprises a supporting yoke 50, which receives and supports the partly formed article 10 in the state in which its bowl portion 11 and base portion 12 have set, but the constricted neck portion 13 (FIG. 15), which is thicker and shorter than the stem portion 17 (FIG. 16) required in the finished article, has not fully set or at least is still sufficiently hot to be rendered workable by heating. The yoke 50, which at least partly embraces the bowl portion of the partly formed article, supports the latter by engaging in a circumferential groove 51, which is formed during the production of the bowl portion 11, at a position above the final burn-off line X-X, by appropriately shaping the inside of the mold in which the bowl portion 11 is formed.

The yoke 50 may comprise a pair of jaws 52 which close around the article (being shown closed in FIGS. 15 and 16) and are shaped to conform generally to the part of the article which they engage, these jaws being preferably formed with or made of a heat insulating material.

The yoke 50 is carried by a structure comprising support rods 53 depending from a rotatable ring 54 which is itself rotatably supported by a fixed support plate 55. Rotation of the ring 54, and with it of the yoke 50 and the article, is effected by driving the ring 54 in any suitable manner.

The base 12 of the partly formed article, as received by the yoke 50, is gripped by means of a split clamping ring 56, the two parts 56a of which are seen in their open position in FIG. 15 and in their closed position in FIG. 16. Semi-annular grooves 57 on the ring parts 56a engage over the peripheral edge of the base portion 12 of the article 10 and clamp it to a platform 58. Heat insulation is provided between the article on the one hand and the platform 58 and clamping ring 56 on the other hand.

The platform 58 is carried by a vertically movable rod 59 guided by bushings 60, 61 secured on respective fixed support plates 62, 63. A spring 64 urges the rod upwardly to bring the platform to a limiting upper position shown in FIG. 15 and determined by a stop collar 65 on the rod 59 coming into engagement with the underside of support plate 62.

Before closing the clamping ring 56, the neck portion 13 of the article 10, taken in the state previously referred to, is preferably heated to render it more workable by subjecting it to the action of a ring or horseshoe of burners 66 while rotating it by driving the ring 54. The burners 66 are removed before closing the ring 56 (see FIG. 15) and the vertically movable rod 59 is then actuated to bring the platform 58 gently toward a limiting lower position (FIG. 16) determined by a stop collar 68 engaging the upper surface of support plate 63. Since the base 12 of the article 10 is clamped to the platform 58, this action produces an elongation of the constricted neck portion 13 to form the required stem portion 17 with a length determined by the position of the collar 67 along the rod 59. The platform 58 is held in its lower position until the stem 16 has set by forced air or natural air cooling, after which a final burnoff can be effected at the level X-X either before or after removing the article from the elongating apparatus.

The method and apparatus embodying the invention permit the efficient manufacture at high speeds of glass articles of varying configurations such as shown in FIGS. 17–22. Specifically, as shown in FIG. 17, the glass article 70 having a bowl portion 71, base 72, and intermediate connecting portion 73. The lower portion 71 has vertically extending grooves 74 therein on the external surface thereof. The grooves on the external surface are formed by shaping the finishing mold and not rotating the parison relative to the finishing mold during the final shaping in the finishing mold.

In the article shown in FIG. 18, the base 75 is formed with a concave symmetrical configuration as at 76. This is achieved by appropriately shaping the forming plate 30 and permitting the forming plate 30 to rotate with the article while it is being formed in the finishing molds.

In the article shown in FIG. 19, a square base 77 is formed by appropriately shaping the lower end of the finishing mold and the forming plate. In forming this type of an article, rotation between the parison and the finishing mold is avoided during the forming in the finishing mold.

Other configurations will be readily apparent to persons skilled in the art. For example, as shown in FIG. 20, the article 78 has a bowl portion 79, a base 80, and an intermediate portion 81. The outer surface of the bowl portion 79 is formed with circumferentially spaced indentations 82 that are formed in the finishing mold. In making the article shown in FIG. 20, rotation between the parison and the finishing mold is avoided during the formation.

In the form of article shown in FIG. 21, the article 83 includes a bowl portion 84, a base 85, and an intermediate portion 86. Portion 86 has embossed or raised portions 87 that are formed by appropriate indentations in the constricted portion of the finishing mold. In making the article shown in FIG. 21, rotation between the finishing mold and the parison is avoided.

In the article shown in FIG. 22, the article 88 includes a bowl portion 89, a base 90, and an intermediate portion 91 having embossed vertically extending portions 92 that are formed by the constricted portion when there is no rotation between the parison and the finishing mold during forming of the article.

Figure 23:
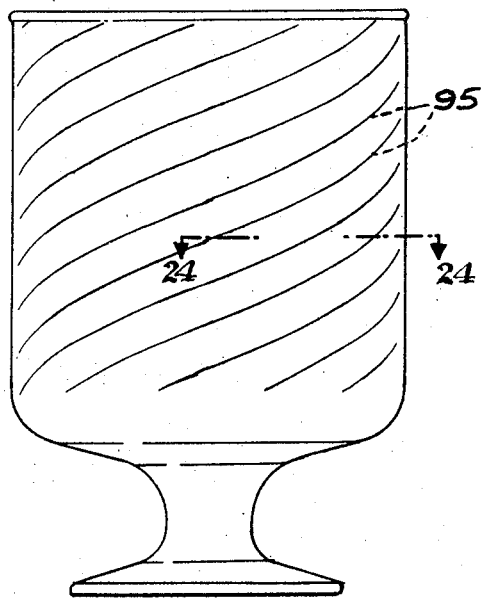
FIG. 23 is an elevational view of a further form of article that can be manufactured in accordance with the invention.
Figure 24:
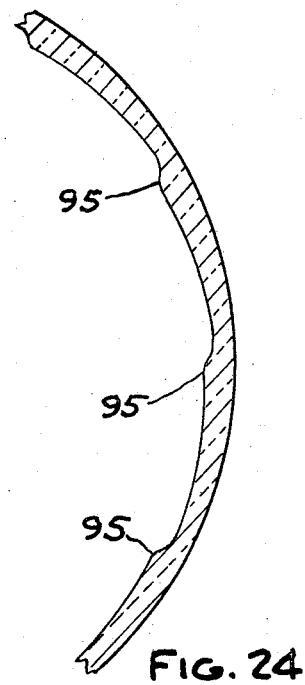
FIG. 24 is a sectional view taken along the line 24—24 in FIG. 23.

In the form of the invention shown in FIGS. 23 and 24, the inner surface of the bowl portion of the article is formed with spiral ribs 95 which are formed by use of a ribbed plunger in forming the parison.

We claim:

1. The method of making an article having a hollow bowl and an intermediate constricted portion interconnecting the bowl to a heavy base from a viscous heat-softened material which comprises delivering a charge of heat-softened material to an open-mouth parison mold, pressing the charge by moving a plunger into the mold to form an axially elongated parison having a substantially conically shaped hollow body and merging integrally with an axially protruding heavy end portion at the apex end thereof, the mass of the heavy end portion being sufficient to produce the constricted portion and heavy base of the article, removing the parison thereby formed from the parison mold, enclosing the parison while it is maintained vertically within a finishing mold having the desired configuration of the final article including a hollow bowl shaping portion, an intermediate constricted portion, and an enlarged base forming portion including a bottom plate, permitting the parison to sag under the action of gravity such that when enclosed by the finishing mold, the lower end of the hollow body portion of the parison is adjacent the intermediate constricted portion of the finishing mold and a portion of the parison is closely adjacent the constricted portion of the finishing mold, forcing a portion of the parison into contact with the constricted portion of the finishing mold by applying fluid pressure into the hollow body portion of the parison, said last-mentioned step being performed before there is any substantial accumulation of heat-softened material on the bottom plate, thereafter forcing the hollow body portion outwardly onto the bowl shaping portion of the finishing mold by applying fluid pressure into the hollow body portion of the parison, and finally applying an exterior axial force to the heavy end portion by moving the bottom plate to force the axially protruding heavy end portion of the parison into configurational conformity with the base forming portion of the finishing mold.

2. The method set forth in claim 1 including the step of rotating the parison substantially continuously while it is enclosed in the finishing mold.

3. The method set forth in claim 1 including the step of permitting additional heat-softened material to pass below the constricted portion such that when the axial force is applied, the final article has a configuration on the interior of the bowl portion which projects into the cavity of the bowl portion of the final article.

4. The method set forth in claim 3 including the step of removing said article from the finishing mold after the body portion thereof has become set and while heat is still retained in the intermediate constricted portion, and thereafter moving the body portion and base axially away from one another to elongate the intermediate constricted portion and produce a stemmed article.

* * * * *

UNITED STATES PATENT OFFICE
CERTIFICATE OF CORRECTION

PATENT NO. : 3,792,988
DATED : February 19, 1974
INVENTOR(S) : Edward A. Nowak and Philip P. Pahl It is certified that error appears in the above-identified patent and that said Letters Patent are hereby corrected as shown below:

Col. 1, line 25, change "1968" to --1963--.

Signed and Sealed this ninth Day of December 1975

[SEAL]

Attest:

RUTH C. MASON
Attesting Officer

C. MARSHALL DANN
Commissioner of Patents and Trademarks